United States Patent [19]

Barriac

[11] Patent Number: 4,530,237
[45] Date of Patent: Jul. 23, 1985

[54] GYROSCOPIC NAVIGATIONAL INSTALLATIONS

[75] Inventor: Jacques Barriac, Plaisir, France

[73] Assignee: Societe d'Applications Generales d'Electricite et de Mecanique Sagem, Paris, France

[21] Appl. No.: 425,878

[22] Filed: Sep. 28, 1982

Related U.S. Application Data

[63] Continuation-in-part of Ser. No. 416,007, Sep. 8, 1982, abandoned.

[30] Foreign Application Priority Data

Sep. 18, 1981 [FR] France ............................ 81 17692
Jul. 28, 1982 [FR] France ............................ 82 13189

[51] Int. Cl.³ ............................................. G01C 21/00
[52] U.S. Cl. .................................................. 73/178 R
[58] Field of Search ...................................... 73/178 R

[56] References Cited

U.S. PATENT DOCUMENTS 4,212,443 7/1980 Duncan et al. ................... 73/178 R Primary Examiner—Stephen A. Kreitman
Assistant Examiner—Vincent P. Kovalick
Attorney, Agent, or Firm—Larson and Taylor

[57] ABSTRACT

A gyroscopic navigational installation for land and sea vehicles for providing characteristics of the trajectory of the vehicle. The installation in one embodiment includes a gimbal mounted on the vehicle and pivotable about an axis. A first gyro is rotatably supported by the gimbal about a rotational axis such that a gyro azimuth sensitivity axis is orthogonal to the longitudinal axis of the vehicle and a gyro rolling sensitivity axis is parallel to the vehicle longitudinal axis. A controlled accelerometer is supported by the gimbal such that an accelerometer pitching sensitivity axis is parallel to the vehicle longitudinal axis and an accelerometer rolling sensitivity axis is parallel to the gyro rotational axis. In an installation according to another embodiment, a second gyro is mounted on the gimbal such that a pitching sensitivity axis thereof is parallel to the rotational axis of the first gyro.

13 Claims, 11 Drawing Figures

GYROSCOPIC NAVIGATIONAL INSTALLATIONS

This application is a continuation-in-part of my previous application Ser. No. 416,007, filed Sept. 8, 1982, now abandoned.

FIELD OF THE INVENTION

The invention relates to gyroscopic navigational installations for knowing the parameters characterizing the trajectory of a vehicle and, possibly, for providing an auxiliary aiming function, either of the vehicle itself or of a part of this vehicle.

The invention applies more particularly, but not exclusively, to gyroscopic navigational installations for land vehicles (such as armored vehicles) and for sea vehicles (such as torpedos).

The invention also applies to gyroscopic navigational installations for probes for exploring underground or underwater drill-holes (such as oil-drills).

BACKGROUND OF THE INVENTION

In the case of a land vehicle, the auxiliary aiming function consists in orientating a weapon carried by the vehicle whereas, in the case of a torpedo, the auxiliary aiming function consists in piloting the torpedo.

For such vehicles (armored vehicles or torpedos), inertial navigation, such as applied to airborne vehicles, proves to be expensive to manufacture and, in addition, does not seem to be adapted to the needs, in particular for the aiming function: in fact, the principle of such inertial navigation is based on the use of gyroscopes and accelerometers and the results supplied are the outcome of the pure and simple integration of the accelerations without any provision of an indication concerning the measured speed with respect to the surrounding environment: the possible performances, such as those obtained with installations of aeronautical origin whose characteristic is of the order of one nautic mile/hour) are ridiculous for a land vehicle.

Installations have therefore been proposed, for land and sea vehicles, using the speeds measured with respect to the sourrounding environment, these installations being based on an integration of these measured scalar speeds by using a directional heading reference and, possibly, a vertical reference.

Thus, very simple installations have been proposed comprising free gyros used as vertical references and free gyros used as North indicators; however, the measurements obtained are relatively inaccurate, because of the inaccurate directional characteristics.

More complex installations have also been proposed comprising, on the one hand, a thread suspension gyro used as North detector when the land vehicle is stopped and, on the other hand, a so-called "directional" gyro with two degrees of freedom stabilizing a dual gimbal system and used while the vehicle is travelling: from the indications supplied by these two elements, and by measuring the speed with respect to the surroundings, it is then possible to obtain a relatively accurate measurement of the movements, to detect and keep the heading with errors of the order of 1 mrd and 1 mrd/hour respectively.

In any case, the installations which have just been discussed above do not allow the parameters characterizing the trajectory of the vehicle to be known, and possibly controlled, and the gyrometric systems for providing the auxiliary aiming or piloting function are separate (case of different positions in the vehicle or case of different pass bands).

These systems are moreover set up in different positions in the vehicle, depending on the nature of the vehicle and the nature of the auxiliary aiming function (e.g. stabilization of a gun).

The aim of the invention is precisely a gyroscopic navigational installation grouping together, in one and the same apparatus, the elements for controlling the parameters characterizing the linear trajectory of the vehicle with good performances (e.g. measurement of the azimuth with a drift equal to or less than 1 degree/hour, detection of the vertical to a tenth of a degree) and for providing the auxiliary aiming function as previously defined with a high pass-band as is required by this kind of function and a high angular sensitivity (e.g. a pass-band of the sensing members of 30 to 50 Hz and a short term angular sensitivity equal to or less than 0.3 mrd), which corresponds to the characteristics required for stabilizing a gun.

It is known that solutions of this type have already been described or developed: it is a question of systems having two or three gyros (two or three depending on whether the technology of single or double axis gyros is used) which have axes of sensitivity on a trirectangle trihedron, and are connected to the vehicle.

With this arrangement, the gyro wheels must accompany all the angular movements of the vehicle through very stiff electronic gyrometric loops (pass-band of about 50 Hz).

These systems are opposed to the older systems which, on the contrary, used three successive stabilized gimbals (roll, pitch and azimuth for example), the central-most gimbal carrying the gyros which were then used as a zero apparatus in so far as the measurement of the angular speeds is concerned.

More recently, the cases of the gyros are connected to the structure of the vehicle; efforts are made to achieve the navigational function while using the available gyrometric measurements for an aiming function with a high passband; however, the major defect of these solutions is very complex coupling when, from analog measurements, delivered by the gyros, it is desired to re-calculate the attitude of the vehicle (heading, roll, pitch).

It is then necessary to use very complicated calculations which are only possible with a miniaturized on-board computer (calculations of 300,000 operations per second), which calculations need to be effected with a double length (typically 32 bits). It is then necessary to compensate in real time, within $10^{-4}$, the conical motion deflections which appear when each input axis of each gyro describes a cone, which deflections are of the orders of magnitude of a few thousandths of a degree/hour, even if the alternate angular movements of the vehicle are of the order of a few degrees.

SUMMARY OF THE INVENTION

The aim of the invention is then a gyroscopic arrangement intermediate between the above recalled techniques, this arrangement using a single gimbal controlled by a single axis of sensitivity.

The calculations to be carried out are then very simple and do not need to be very accurate: these calculations may then be provided by analog computation or by a simple updown counting digital technique.

The invention also has as its aim an installation which involves no positional limitation as to the attitude of the vehicle (vertical axis torpedo for example).

The installation in accordance with the invention also has as its aim:

a system giving an attitude of the vehicle in the terrestrial axes (azimuth, pitch, roll), this system being coupled to a speed measurement with respect to the surroundings (log, caterpillar track), this system providing the navigational function, a system capable of carrying out the auxiliary aiming function (stabilization and fire control of a gun on a land vehicle or piloting of a torpedo).

According to the invention, the guidance installation comprises the following elements:

a gimbal mounted on the vehicle for pivoting about an axis, a first double axis gyro mounted in this gimbal, so that one of its two axes of sensitivity (azimuth sensitivity axis) is orthogonal to the longitudinal axis of the vehicle, the other axis of sensitivity of this first gyro (roll sensitivity axis) being parallel to the longitudinal axis of the vehicle, and so that the rotational axis of its gyro wheel is maintained in a horizontal plane, a controlled double axis accelerometer mounted on this gimbal, so that one of its two axes (pitch sensitivity axis) is parallel to the longitudinal axis of the vehicle and the other axis of sensitivity (roll sensitivity axis) is parallel to the rotational axis of the first gyro, this controlled accelerometer delivering two analog signals $SA_x$ and $SA_y$, representative of the measurement of the accelerations along said two axes of sensitivity;

and a second gyro with at least one axis of sensitivity (pitch sensitivity axis) mounted on this gimbal, so that this pitch sensitivity axis is parallel to the rotational axis of the first gyro and so is horizontal.

Such being the case, these elements cooperate in the following way:

the azimuth position detectors of the first gyro control the azimuth precessional torquer of the first gyro and give an indication which is used, on the one hand, to obtain the azimuth parameters characterizing the trajectory of the vehicle (angular rate $\Omega_z$) and, on the other hand, so as to obtain the auxiliary azimuth aiming function (piloting of the vehicle such as a torpedo or else azimuth stabilization of the gun), the roll position detectors of the first gyro control the motor providing control of the gimbal during rolling, this latter drives the stator of a roll position angular detector, and give indications which are used to obtain the auxiliary roll aiming function (e.g. zero roll piloting), the pitch position detector of the second gyro controls the pitch precessional torquer of the second gyro and gives an indication (measurement $\Omega_x$) which is used to obtain the auxiliary aiming function during pitching (angular pitching rate or pitch calculation), the roll inclination signal $SA_x$ of the accelerometer (after correction of the centrifugal effect $\Omega_z.V$) is used for levelling, by precession, the rotational axis of the first gyro) which causes a slow rotation of the gimbal about the roll sensitivity axis of this first gyro, the pitching inclincation signal $SA_y$ of the accelerometer (which signal, in the short term, presents a noise) indicates the pitching (if it is filtered) in the long term; the second gyro indicates in the short term an exact rate $\Omega_x$ which is the pitching rate, whereby the complementarity of the spectra of the signals $SA_y$ and $\Omega_x$ allows a digital or analog computing loop to be formed leading to a computed value of pitching which is more or less exact over the whole spectrum range, both in the long and in the short term.

The second gyro may be formed by a rate gyro, by a floating gyro with a single axis looped electrically as a rate gyro, or by a double axis gyro only one of whose axes is used (a gyro electrically looped as a rate gyro on both its axes).

The first gyro G is looped about its azimuth sensitivity axis $G_Z$ (pseudo vertical axis) so as to give the measured gyrometric value $(G_Z)_m$.

Moreover, this first gyro G is looped on the gimbal about its roll sensitivity axis $G_Y$. This looping operation about axis $G_Y$ would be suitable if the vehicle moved solely in the horizontal plane (zero pitching) so as to maintain the rotational axis $S_G$ of the first gyro G in a horizontal position.

This first gyro G receives a computed precession $\Omega_z.\tan(Ta)_c$.

In turns (trajectory of the vehicle comparable locally to a helix), there occurs a non zero rate $(\Omega_z)_m$ and also non zero pitching $(Ta)_c$.

The need to maintain the rotational axis $S_G$, in the short term, in a horizontal plane means that the overall precessional torque must be horizontal.

Gyro G must then receive, at its roll precessional torquer $M_{GY}$, the torque $H(\Omega_z)_m.\tan(Ta)_c$, in which formula H is the angular momentum of gyro G, $(\Omega_z)_m$ is the gyrometric measurement, $(Ta)_c$ is the computed pitching.

With this arrangement, the sensitive axes $G_Z$ and $G_X$ describe extremely flat cones (zero conical movement deflection for said sensitive axes).

In the case of a probe for exploring underground or underwater drill-holes, the vehicle formed by the probe is subjected to a substantially zero pitching force and a constant linear speed during its slow and continuous descent into the drill-hole; consequently, filtering of the accelerometric signals for a few seconds is sufficient for determining the pitching of the vehicle.

According to an arrangement of the invention more particularly adapted to this type of vehicle, the gyroscopic installation comprises the following elements:

a gimbal mounted on the vehicle for swivelling about the longitudinal axis of the vehicle, a double axis gyro mounted on this gimbal so that one of its two axes (azimuth sensitivity axis) is orthogonal to the longitudinal axis of the vehicle, the other axis of this gyroscope (roll sensitivity axis) being parallel to the longitudinal axis of the vehicle and so that the axis of rotation of its gyro wheel is maintained in a horizontal plane, and a controlled accelerometer with two axes of sensitivity mounted on this gimbal so that one of its two axes (pitching sensitivity axis) is parallel to the longitudinal axis of the vehicle and the other axis of sensitivity (roll sensitivity axis) is parallel to the axis of rotation of the gyroscope, this controlled accelerometer delivering two analog signals $SA_x$ and $SA_y$, representative of the measurement of the accelerations along said two axes of sensitivity.

This being so, these elements cooperate together in the following way:

the azimuth position detectors of the gyroscope control the azimuth precessional torquer of the gyro and give an indication which is used for obtaining the azimuth parameters characterizing the trajectory of the vehicle (angular speed $\Omega_z$), the roll position detectors of the gyro control the motor controlling the gimbal during rolling; this latter drives the stator of an angular roll position detector;

the roll inclination signal $SA_x$ of the accelerometer (after correction of the centrifugal effect $\Omega_z.V$) is used for levelling, by precession, the axis of rotation of the gyro (which causes a slow rotation of the gimbal about the roll sensitivity axis of the gyro).

The accelerometric inclination signal $SA_y$ of the accelerometer indicates the pitching of the vehicle considering the absence of a rapid pitching force and the constant speed of the vehicle.

According to another arrangement of the invention, relating more particularly to gyroscopic navigational installations for a vehicle subjected to a substantially zero pitching force, and a substantially constant linear speed, the installation comprises:

a gimbal mounted on the vehicle for swivelling about the longitudinal axis of the vehicle, a double axis gyro mounted on this gimbal so that one of its two axes of sensitivity (azimuth sensitivity axis) is orthogonal to the longitudinal axis of the vehicle, the other axis of sensitivity of this gyro (roll sensitivity axis) being parallel to the longitudinal axis of the vehicle and so that the rotational axis of its gyro wheel is maintained in a horizontal plane, and a controlled accelerometric block with at least two axes of sensitivity mounted on this gimbal so that, for two of them, one of its two axes (azimuth sensitivity axis) is parallel to the azimuth sensitivity axis of the gyro, and the other axis of sensitivity (roll sensitivity axis) is parallel to the axis of rotation of the gyro.

This being so, these elements cooperate together in the following way:

the azimuth position detectors of the gyro control the azimuth precessional torquer of the gyro and give an indication which is used for obtaining the azimuth parameters characterizing the trajectory of the vehicle (angular speed $\Omega_z$);

the roll position detectors of the gyro control the roll control torquer of the gimbal; this latter drives the stator of an angular roll position detector;

the roll inclination signal $SA_x$ of the accelerometer is used for levelling, by precession, the rotational axis of the gyro (which causes a slow rotation of the gimbal about the roll sensitivity axis of the gyro).

The inclination signal $SA_z$ of the accelerometer (which signal, in the short term, presents a noise) indicates, in the long term (if it is filtered), the pitching of the vehicle or the slope of the trajectory followed.

According to a variation of this arrangement, the controlled accelerometric block comprises three axes of sensitivity, namely:

an axis of sensitivity parallel to the azimuth sensitivity axis of the gyro, a roll sensitivity axis parallel to the rotational axis of the gyro, and a pitching sensitivity axis parallel to the longitudinal axis of the vehicle, whereby it is possible to effect a good measurement of the slope, even if a substantially horizontal trajectory is described (which is an improvement on the above arrangement which did not allow such a measurement).

Under these conditions, the pitching inclination signal $SA_y$ of the accelerometer further indicates, in the long term, the pitching of the vehicle.

It should also be noted that, when the longitudinal axis of the vehicle is substantially vertical, and the vehicle is stopped and locked, the installation then behaves because of the arrangement of the axes of sensitivity of the gyro and of the accelerometric block, like a connected component North seeking installation (possibility of bringing the roll sensitivity axis of the gyro close to the East-West line, which gives a good measurement of the inclination of the rotational axis of the gyro and of its roll sensitivity axis, which measurement is required for correcting the projection of the Earth's rotation vector on the roll sensitivity axis of the gyro).

This latter arrangement and the variation thereof apply then more particularly to the case of navigational gyroscopic installations for vehicles of the kind such as probes for exploring underground or underwater drillholes such as oil-drills.

The invention consists, apart from these arrangements which have just been discussed above, of certain other arrangements which are preferably used at the same time and which will be more explicitly described hereafter.

The invention will, in any case, be well understood from the complement of description which follows as well as the accompanying drawings, which complement and drawings are relative to a preferred embodiment of the invention and comprise, of course, no limiting character.

DESCRIPTION OF PREFERRED
EMBODIMENTS OF THE INVENTION

Figure 1:
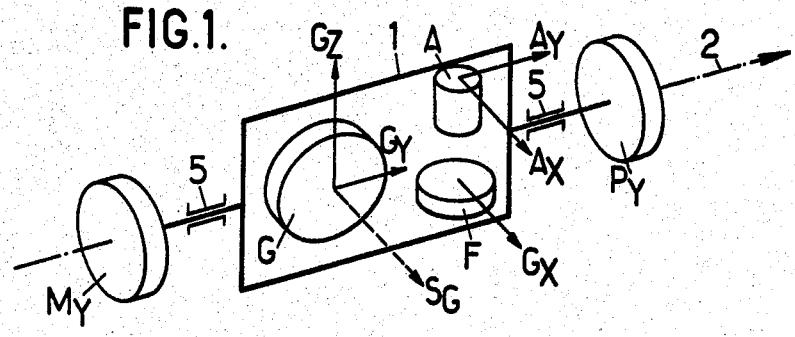
FIG. 1 of these drawings is a schematical perspective view showing the component elements of the installation of the invention.

In FIG. 1 there is shown schematically the component elements of a gyroscopic navigational installation mounted on a vehicle and allowing the parameters characterizing the trajectory of this vehicle to be known, on the one hand, and an auxiliary aiming (or aiming assistance) function to be provided for at least a part of this vehicle.

This vehicle is not shown as a whole, but its longitudinal axis 2 has been shown.

If it is a land-based vehicle, for example an armored vehicle such as a tank, the function of the navigational installation is to know the parameters characterizing its trajectory over the ground and to provide an auxiliary function for assisting aiming of the weapon carried by the turret of the armored vehicle, i.e. absolute azimuth and elevational aiming of the weapon, this assistance consisting, for example, in anticipating the speed lag errors of the motors which stabilize the weapon during rapid movements of the chassis of the vehicle, these speed lag errors being due to their counter electromotive force and to the high gearing ratios (high torque).

If it is a question of a sea vehicle, for example a vehicle such as a torpedo, the function of the navigational installation is to control the parameters characterizing its trajectory in the liquid environment and to provide an auxiliary aiming function for the torpedo, i.e. azimuth, rolling and pitching piloting of the torpedo, in accordance with an internal programmer of desired movements.

This installation comprises:

a single gimbal 1 mounted on the vehicle through bearings 5 and pivotable about a longitudinal axis 2, said gimbal being integral with a rolling control motor $M_Y$ and a rolling position angular detector $P_Y$, a first double axis gyro G mounted on this gimbal 1 so that one of its two axes of sensitivity (azimuth sensitivity axis $G_Z$) is orthogonal to the axis 2 of the vehicle, the other axis of sensitivity (rolling sensitivity axis $G_Y$) being parallel to the longitudinal axis 2 of the vehicle and so that the rotational axis $S_G$ of its gyro wheel 7 is maintained in a horizontal plane, a controlled accelerometer with two axes of sensitivity A; mounted on this gimbal 1 so that one of its two axes of sensitivity (pitching sensitivity axis $A_Y$) is parallel to the longitudinal axis 2 of the vehicle, and the other axis of sensitivity (rolling sensitivity axis $A_X$) being parallel to the rotational axis $S_G$ of the first gyro G, and a second gyro F with at least one axis of sensitivity (rolling sensitivity axis $G_X$) mounted on this gimbal 1, so that this rolling sensitivity axis $G_X$ is parallel to the rotational axis $S_G$ of the gyro wheel 7 of the first gyro G and so is horizontal.

If it is a question of a vehicle formed by a probe for exploring a drill-hole (underground or underwater), the installation will not comprise this second gyro; in fact, since the pitching force on this type of vehicle is substantially zero, the pitching will be calculated directly from the filtered accelerometric measurement.

The controlled accelerometer A delivers two signals $SA_x$ and $SA_y$ representative of the measurement of the accelerations along said rolling $A_X$ and pitching $A_Y$ axes of sensitivity.

Figure 2:
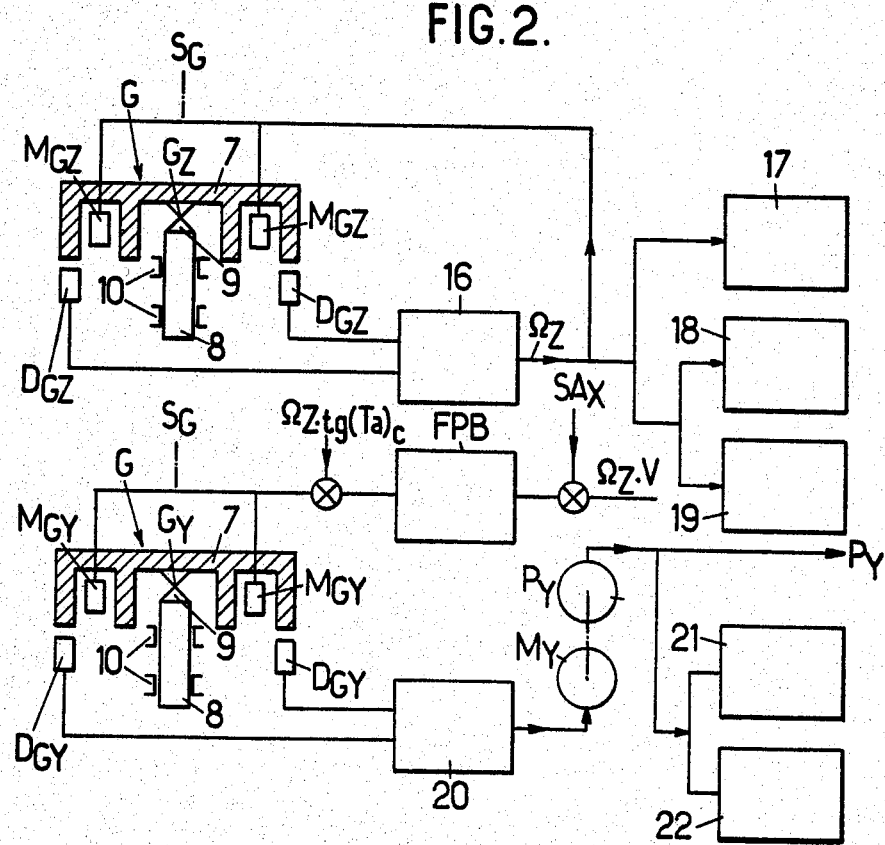
FIGS. 2 to 4 are respectively three diagrams showing the way in which the component elements of the installation shown in FIG. 1 cooperate together.

In FIG. 2 the first gyro G has been shown twice, in two sections made respectively perpendicularly to its azimuth axis of sensitivity $G_Z$ and perpendicularly to its rolling sensitivity axis $A_Y$.

This first gyro G comprises a gyro wheel 7 carried by a shaft 8 through a HOOCKE seal 9, this shaft 8 being held in position by bearings 10.

The position of the gyro wheel 7 is controlled,
by two azimuth position detectors $D_{GZ}$,
by two rolling position detectors $D_{GY}$,
by an azimuth precessional torquer $M_{GZ}$,
and by a rolling precessional torquer $M_{GY}$.

Figure 3:
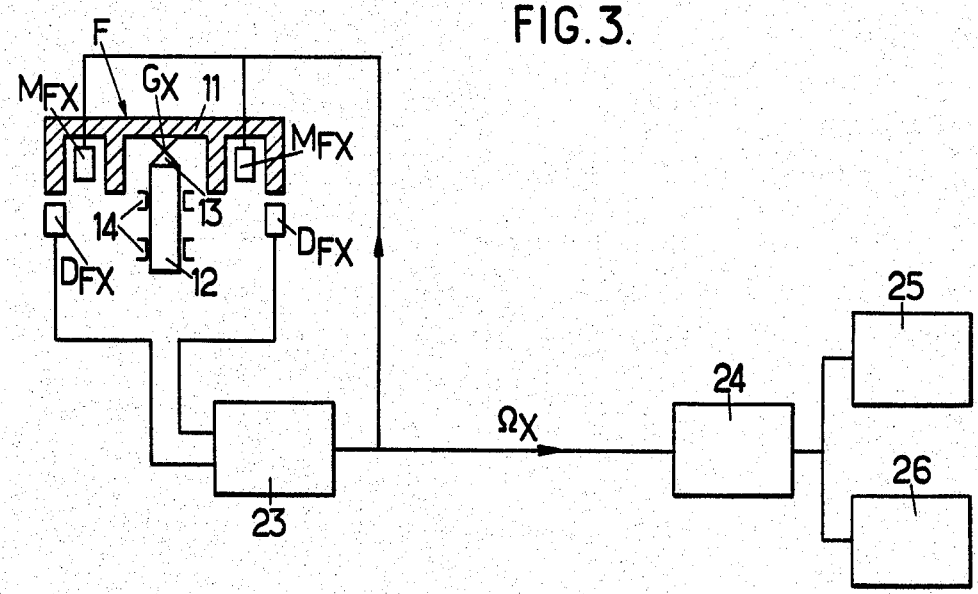

In FIG. 3 the second gyro F has been shown in a section perpendicular to its pitching sensitivity axis $G_X$.

This second gyro F is assumed to be a gyro with two axes of sensitivity of which only the pitching sensitivity axis $G_X$ is used.

This second gyro F has then a structure similar to that of the first gyro G and it comprises a gyro wheel 11 carried by a shaft 12 through a HOOCKE seal 13, this shaft 12 being held in place by bearings 14.

The position of the gyro wheel 11 is controlled:
by two pitching position detectors $D_{FX}$,
and by two pitching precessional torquers $M_{FX}$.

Figure 4:
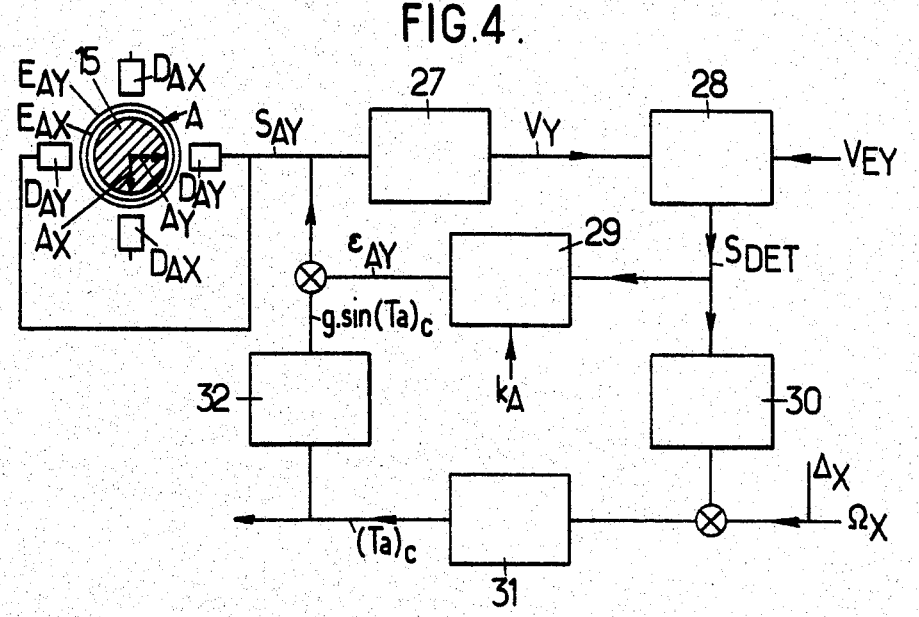

In FIG. 4, the accelerometer A has been shown in a section through a plane containing its two pitching $A_Y$ and rolling $A_X$ axes of sensitivity.

This accelerometer A comprises a controlled mass 15 whose position is controlled,
by two pitching position detectors $D_{AY}$,
by two rolling position detectors $D_{AX}$,
and by two control windings $E_{AX}$ and $E_{AY}$.

The two azimuth position detectors $D_{GZ}$ of the first gyro G control, through an electronic device 16 providing more especially the AC amplifying then demodulating function, the azimuth precessional torquer $M_{GZ}$ of the first gyro G (FIG. 2).

These two azimuth position detectors $D_{GZ}$ give, still through the electronic device 16, the gyrometric measurement $\Omega_z$ which is used, on the one hand, in a measuring device 17 for obtaining the azimuth parameters characterizing the trajectory of the vehicle (this measuring device 17 provides spatial integration of the rate $\Omega_z$ combined with the pitching value or angle Ta, in the form $$\int_o^t \frac{\Omega_z}{\cos Ta} \cdot dt$$

and, on the other hand, in a measuring device 18 or 19 for obtaining the auxiliary azimuth aiming function (auxiliary function for azimuth aiming of the weapon carried by the turret of the land vehicle, i.e. assisting the azimuth aiming of the weapon, or an auxiliary function for azimuth aiming of the torpedo, i.e. azimuth piloting of the torpedo.

The two rolling position detectors $D_{GY}$ of the first gyro G control, through an electronic device 20 providing more especially the alternating amplifier then demodulating function, the rolling control motor $M_Y$ of gimbal 1 (FIG. 1).

This control motor $M_Y$ mechanically drives the rolling position detector $P_Y$ of gimbal 1 which gives, for the aiming function, the rolling angle.

These two rolling position detectors $D_{GY}$ give, still through the electronic device 20 and gimbal 1, indications which are used in a measuring device 21 or 22 for obtaining the auxiliary roll aiming function. It may be a question of an auxiliary function for elevational aiming of the weapon carried by the turret of the land vehicle (in this case, the primary axis of gimbal 1 is disposed transversally with respect to the fiducial line of the vehicle), or else an auxiliary function for roll aiming of the torpedo, i.e. piloting of the torpedo during rolling.

The signal $SA_X$ delivered by accelerometer A is fed with slow precession to the roll precessional torquer $M_{GY}$ of gyro G to level its rotational axis $S_G$ and to maintain gimbal 1 vertical whatever the angular movements of the vehicle. Signal $SA_X$ transits through a low pass filter FPB before being fed to said torquer $M_{GY}$.

The roll precessional torquer $M_{GY}$ of gyro G (torquer which levels the rotational axis $S_G$ of this gyro G) receives, in addition to the signal $SA_X$ from the accelerometer A (signal $SA_X$ possibly corrected for centrifugal acceleration in turns, i.e. $\Omega_z.V$, $\Omega_z$ being the angular azimuth rate and V the axial speed of the vehicle, another precessional signal which has a high pass band when signal $SA_X$ is filtered by the low pass filter FPB.

This signal (see FIG. 2) is in the form $\Omega_z.\tan Ta_c$, in which formula $\Omega_z$ is the measurement of gyro G about its axis $G_Z$ and $Ta_c$ the calculated pitching angle outputted by an independent computing loop and which will be discussed more explicitly hereafter. This computation results from optimum coupling of the measurements $G_X$ and $SA_Y$ about the pitching axis.

It is in fact indispensable to calculate the signal $\Omega_z.\tan Ta_c$; if we consider a vehicle describing a downward helix, its fiducial line being the tangent to this downward helix inclined by the pitching angle $T_a$ to the horizontal plane (see FIG. 5), the rotational axis $S_G$ of gyro G being maintained horizontal, it must then describe a horizontal plane.

The overall precessional torque which is exerted on the gyro wheel of gyro G when the vehicle turns in azimuth must then also be horizontal. The axis of action of the azimuth precessional torquer $G_{GZ}$ of gyro G is then inclined by an angle Ta to the horizontal, and it supplies, by means of the pitching precessional loop, a non horizontal torque $H\Omega_z$.

A torque $H\Omega_z \tan Ta$ must then be applied simultaneously to the roll precessional torquer $M_{GY}$, so that the overall torque applied by the pitch $M_{GZ}$ and roll $M_{GY}$ precessional torquers is a horizontal torque, and so that the rotational axis $S_G$ remains then horizontal during the whole turning movement of the vehicle. The alternating yawing movements of the vehicle having possibly a frequency of the order of a Hz (during downward motion), calculation of the term $\Omega_z \tan (Ta)_c$ must be made with a high pass band (of the order of 20 Hz).

However, the calculation may have only a very low accuracy; for example, 1% error for $\pm 3°$ yaw at 1 Hz and a slope of $12°=0.2$ rd, only causes an alternating error of $\pm 0.3'$ on the horizontality of the rotational axis $S_G$ of gyro G, so a negligeable error ($\pm 1\%$ of $0.2 \times 180' = \pm 0.3'$).

A similar calculation, for a 90° turn of the vehicle with a known constant slope of 12° within 1%, gives a horizontality error of about 10', which is still very acceptable since that corresponds to 0.18°.

Moreover, this horizontality error will slowly disappear when the vehicle assumes again a rectilinear travel path, because of the slow precession due to the action of signal $SA_X$ on the roll precessional torquer of gyro G.

The two pitching position detectors $D_{FX}$ of the second gyro F control, through an electronic device 23 providing more especially the alternating amplification then demodulation function, the pitch precessional torquer $M_{FX}$ of the secod gyro F generating the measured angular rate $\Omega_x$ (FIG. 3).

These two pitching position detectors $D_{FX}$ give, still through the electronic device 23 and through a summing device 24 receiving a correction signal which will be discussed more explicitly hereafter, the measurement $\Omega_x$ corrected by a fixed error (drift of the gyro, if such be the case) which is used, in a measuring device 25 or 26, for obtaining the auxiliary pitch aiming function. It may be a question of an auxiliary function for aiming with vertical slant with respect to the sighting plane of the weapon carried by the turret of the land vehicle (if the primary axis of gimbal 1 is disposed transversely), or else an auxiliary function for roll aiming of the torpedo, i.e. piloting of the torpedo during pitching.

The two pitching position detectors $D_{AY}$ of accelerometer A control the mass 15 of accelerometer A along the pitching axis and measure the acceleration along the pitching axis of sensitivity $A_Y$ (signal $SA_Y°$. This is possible because a DC current is fed into the control winding $E_{AY}$ of the accelerometer.

Signal $SA_Y$ is used for cooperating with the two other following measurements:

measurement of the wide band pitching angular rate $\Omega_x$, which is accurate in the short term, but whose integration would drift in the long term (fixed unknown drift of gyro G), which makes a computed pitching indication impossible;

measurement of the axial linear spped of the vehicle $V_{EY}$, known with respect to the surrounding environment, this measurement being formed by a value containing noise but without divergence in the long term.

In fact, the accelerometer measurement $SA_Y$ is the sum of the four following terms:

a "low frequency" acceleration corresponding to the speed variations $V_Y$ of the vehicle, a "noise" acceleration corresponding to the vibrations, to the rapid accelerations due to rolling and pitching of the vehicle, to speed variations not sensed by the external speed pick-off, an acceleration corresponding to the gravity component, g sin Ta, Ta designating the true pitching, a "parasite acceleration" $\epsilon_{AY}$ corresponding to a zero error of accelerometer A.

It can then be seen that if we subtract from the signal $SA_Y$ the derivative of speed $V_{EY}$, there only remains the signal g sin Ta+"noise acceleration"+"parasite acceleration $\epsilon_{AY}$". This new signal is filtered by a lowpass filter (filtering time greater than 30 seconds) and allows an exact mean value of the pitching to be obtained; this value is however inaccurate in the short term for frequencies of the order of a Hz for example (frequencies corresponding to the suspension of the vehicle).

On the contrary, the pure and simple integration of the gyrometric measurement $\Omega_x$ (generally linear within $10^{-4}$) would give an exact reflection of the rapid pitching movements ($\pm 6°$ at 1 Hz, for example), but would diverge linearly in the long term, to reach a divergence of 1 m rd within 60 seconds.

It can then be seen that the time during which the gyro G can be counted on for computing the pitching may reach 60 seconds, even a few minutes, which allows accelerometer A, which delivers the filtered signal $SA_y$, to detect the linear drift which appears on the pitching Ta.

The accelerometer A may then compensate for the fixed drift of gyro G, which furthermore allows improvement of the time during which the gyro alone can be counted on for computing the pitching.

Conversely, if the vehicle is travelling over horizontal ground, integration of the signal $SA_y$, which ought to give the speed $V_{EY}$ at all times, does not give it because of the parasite acceleration $\epsilon_{AY}$.

The difference existing then between $V_{EY}$ and $$\int_o^t (SA_y - g \sin Ta)dt$$

allows the zero error of accelerometer A to be corrected to better than $10^{-4}$ g, because of a term proportional to this deviation (coefficient $k_A$).

FIG. 3 shows then the principle for looping as a rate gyro used on the pitching axis of sensitivity $G_X$ of the second gyro F, by means of the alternating amplifier-demodulator 23.

FIG. 4 shows a continuous analog or digital type loop, using the three information signals $SA_x$, $\Omega_x$ and $VE_y$.

The signal $SA_y$ is integrated by cell 27 which delivers a signal $V_Y$ corresponding to the estimated inertial speed.

Signal $V_y$ is combined in cell 28, with the signal $V_{EY}$ (axial linear speed of the vehicle) to form a divergence and correction detection signal $S_{DET}$ corresponding to the drift of accelerometer A and to the drift of the second gyro F.

This detection signal $S_{DET}$ is fed to a cell 29 which receives the coefficient $k_A$ representing the proportional term mentioned above, to a cell 30 which computes the fixed drift of the gyro.

Cell 29 delivers a signal representing the parasite acceleration $\epsilon_{AY}$ which is combined, for correction purposes with signal $SA_y$ before inputting thereof into cell 27.

Cell 30 delivers a signal representing the drift of the gyro. This signal is combined with the signal $\Omega_x$ (from cell 23 associated with the second gyro G), which is itself falsified by a fixed error $\Delta_x$.

The signal resulting from this combination is integrated in cell 31 whose output delivers the computed pitching $(Ta)_c$.

A cell 32 elaborates the signal $g \cdot \sin(Ta)_c$ which is mixed with signal $\epsilon_{AY}$ representing the parasite acceleration, before combination of this signal with signal $SA_y$.

Thus, it can be seen that accelerometer A gives a long term accuracy for the computed pitching signal $(Ta)_c$, the second gyro F gives a very short term accuracy for the real pitching (exact reproduction of the rapid angular movements), accelerometer A contributes in estimating the drift of the signal of the gyro after a few minutes, the external speed $V_{EY}$ serves for automatically correcting, after a few minutes operation of the loop, the value of signal $SA_y$ falsified by the signal $\epsilon_{AY}$ (zero error of the accelerometer).

Such a looping arrangement is very simple and is made posible by the fact that the pitching sensitivity axis $G_X$ of the first gyro G is maintained always horizontal, and the pitching sensitivity axis $G_X$ of the first gyro G describes ultra flat conical movements (zero steradian area, therefore zero conical drift of this axis).

Figure 5:
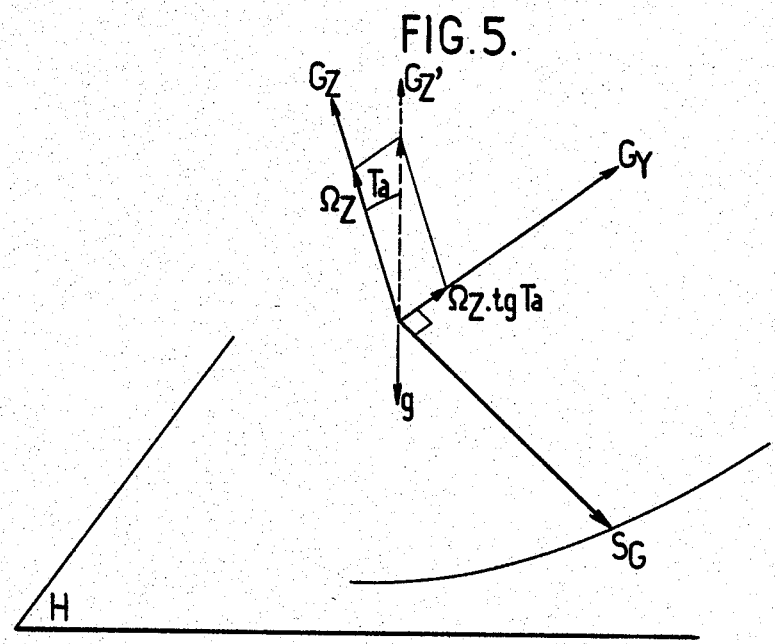
FIG. 5 is an explanatory diagram of the operation of the installation of the invention.

Similarly, the heading computation is effected by a simple formula of the type (integration of the measurement of an imaginary gyro $G_{Z'}$, with a substantially vertical axis which would measure $\Omega_z/\cos Ta$, see FIG. 5).

$$K = k_o + \int_0^t \frac{(\Omega_z)_M}{\cos (Ta)_c} dt - (\Omega_T \sin L + B)(t - t_o),$$

in which formula:
K is the heading, $k_o$ is the initial heading, $\Omega_T \sin L$ is the vertical component of the Earth's rotation, B is the imbalance of the gyro wheel of the first gyro G, t is the time.

This formula is applicable because the axis of rotation $S_G$ of the first gyro G is held horizontal, which results in the invalidation of the drift of the conical movement about the azimuth sensitivity axis of the imaginary gyro $G_{Z'}$ (conical movement of axis $G_{Z'}$ of zero steradian area in the Earth's space whatever the movements of the body of the vehicle).

Figure 6:
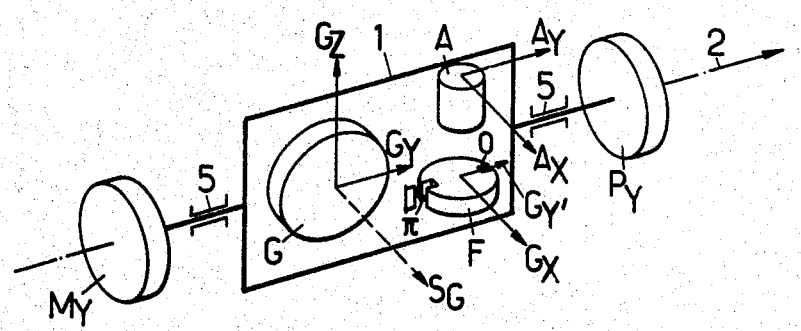
FIG. 6 illustrates, under the same conditions as FIG. 1, a variation of the invention.

According to the variation of the invention shown in FIG. 6, in which the same reference figures designate the same elements as in FIG. 1, the second gyro F, with two degrees of freedom, is movably mounted on gimbal 1, so as to occupy two diametrically opposite position "O" and "$\pi$" by pivoting about an axis parallel to the azimuth sensitivity axis $G_Z$ of the first gyro G.

When the vehicle is motionless, the two axes of sensitivity $G_X$ and $G_Y$ of this second gyro F are used for measuring, by using this second gyro F as a rate gyro $\Omega \cos L \cos K_o + d_x$ position O $\Omega \cos L \cos K_o - d_x$ position $\pi$ $\Omega \cos L \sin K_o + d_y$ position O $\Omega \cos L \sin K_o - d_y$ position $\pi$ $\Omega \cos L$ designating the horizontal component of the Earth's rotation, $K_o$ designating the initial heading, $d_x$ and $d_y$ designating the fixed drifts of the second gyro F. Thus, the value of the initial heading $K_o$ can be computed and the fixed drifts of the second gyro F eliminated.

According to the embodiment of the invention shown in FIG. 1, the pivoting axis 2 of gimbal 1 is parallel to the longitudinal axis of the vehicle.

According to a variation not shown of the invention, the pivoting axis of the gimbal could be disposed transversely with respect to the longitudinal axis of the vehicle, this variation appearing particularly advantageous for applying in the case of stabilization of a firing weapon.

Figure 7:
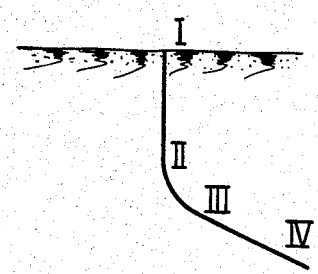
FIG. 7 illustrates the diagram of a drill-hole into which an exploration probe may be let down for knowing the geometrical characteristics of this drill-hole.

In FIG. 7 there is shown the diagram of a drillhole starting from a point I situated on the surface, following first of all, over a portion I-II, a vertical rectilinear path then, over a portion II-III, a curved path and, finally, over a portion III-IV, a rectilinear or slightly curved path whose inclination, with respect to the vertical, may reach 75° and even more (this path being able at the limit to be horizontal). In portion III-IV, the azimuth navigational principle functions as described above (FIGS. 1 to 6).

Figure 8:
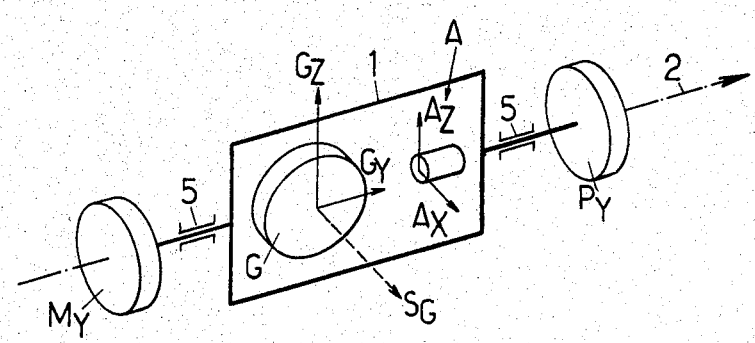
FIG. 8 is a schematical perspective view showing the component elements of the installation according to another arrangement of the invention.
Figure 9:
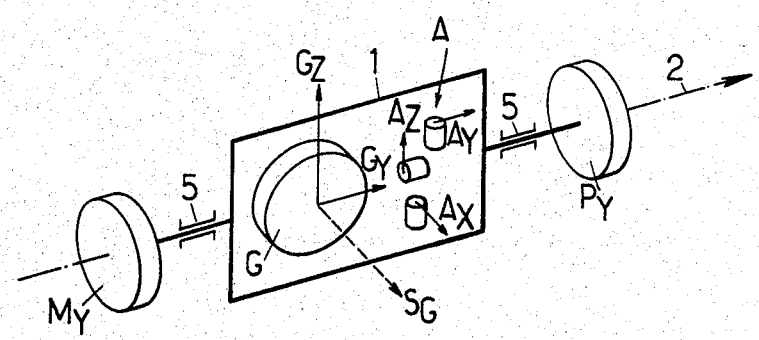
FIG. 9 is a schematical perspective view showing the component elements of the installation according to a variation of this arrangement of the invention.

According to the arrangement of the invention shown in FIGS. 8 and 9, the installation comprises:

a single gimbal 1 mounted, through bearings 5, on the vehicle for swivelling about the longitudinal axis 2 of the vehicle, said gimbal 1 being integral with a rolling control motor $M_Y$ and an angular rolling position detector $P_Y$, a double axis gyro G mounted on this gimbal 1 so that one of its two axes of sensitivity (azimuth sensitivity axis $G_Z$) is orthogonal to the axis 2 of the vehicle, the other axis of sensitivity (rolling sensitivity axis $G_Y$) being parallel to the longitudinal axis 2 of the vehicle and so that the rotational axis $S_G$ of its gyro wheel is maintained in a horizontal plane, and a controlled accelerometric block A with at least two axes of sensitivity mounted on this gimbal 1 so that one of its two axes (azimuth sensitivity axis $A_Z$) is parallel to the azimuth sensitivity axis $G_Z$ of gyro G and the other axis of sensitivity (rolling sensitivity axis $A_X$) is parallel to the rotational axis $S_G$ of gyro G.

Figure 10:
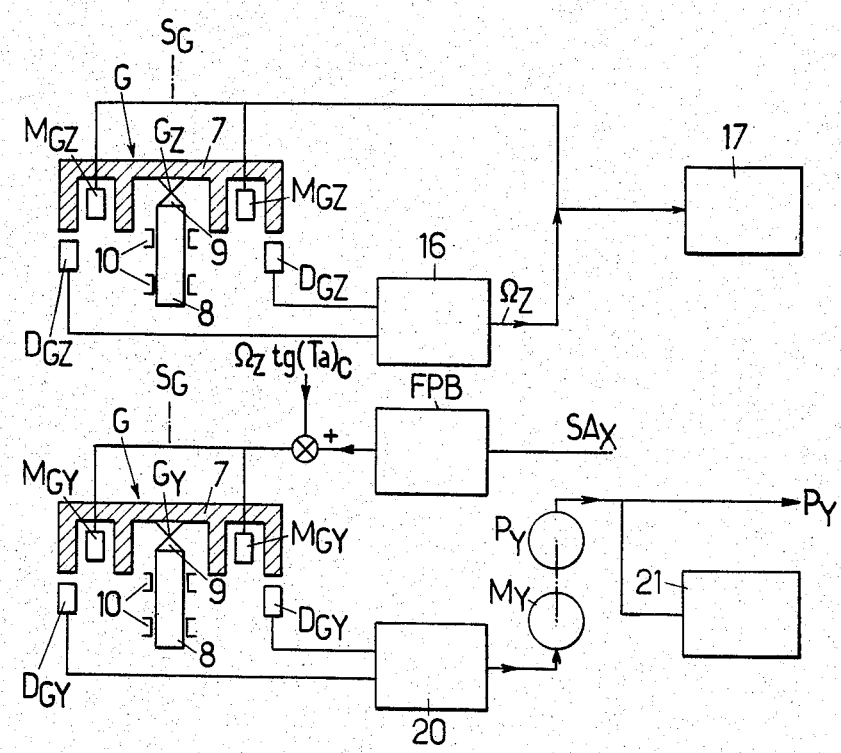
FIGS. 10 and 11 show respectively two diagrams showing the way in which the component elements of the installation shown in FIGS. 8 and 9 cooperate together.

In FIG. 10, gyro G has been shown twice along two sections made respectively perpendicularly to its azimuth sensitivity axis $G_Z$ and perpendicularly to its rolling sensitivity axis $G_Y$.

This gyro G comprises a gyro wheel 7 carried by a shaft 8 through a Hoocke seal 9, this shaft 8 being held by bearings 10.

The position of the gyro wheel 7 is controlled,
by two azimuth position detectors $D_{GZ}$,
by two rolling position detectors $D_{GY}$,
by an azimuth precessional torquer $M_{GZ}$,
and by a rolling precessional torquer $M_{GY}$.

The two azimuth position detectors $D_{GZ}$ of gyro G control, through an electronic device 16 providing the alternating amplifier then demodulator function, the azimuth precessional torquer $M_{GZ}$ of gyro G.

These two azimuth position detectors $D_{GZ}$ give, still through the electronic device 16, the gyrometric measurement $\Omega_z$ which is used in an azimuth measurement device 17.

The two rolling position detectors $D_{GY}$ of gyro G control, through an electronic device 20 providing more especially the alternating amplifier then demodulator function, the motor $M_Y$ for controlling gimbal 1 during rolling.

The control motor $M_Y$ drives mechanically the rolling position detector $P_Y$ of gimbal 1 which gives the rolling angle which is used in a rolling measurement device 21.

The rolling inclination signal $SA_X$ of accelerometer A, filtered by the low-pass filter FPB, is fed with slow precession to the rolling precessional torquer $M_{GY}$ of gyro G for levelling its rotational axis $S_G$ and maintaining gimbal 1 vertical whatever the angular movements of the vehicle.

The inclination signal $SA_Z$ of accelerometer A is filtered and indicates the pitching of the vehicle $(TA)_c$ required for the precession $\Omega_z \tan(TA)_c$ of gyro G along its rolling sensitivity axis $G_Y$ (wide passband value).

Figure 11:
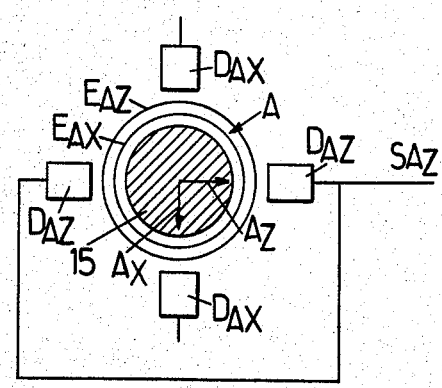

In FIG. 11 is shown accelerometer A along a section through a plane containing its two axes of sensitivity $A_Z$ and $A_X$.

This accelerometer comprises a controlled mass 15 whose position is controlled
by two position detectors $D_{AZ}$,
by two rolling position detectors $D_{AX}$,
and by two control windings $E_{AX}$ and $E_{AZ}$.

In the variation shown in FIG. 9, the accelerometric block A comprises three axes of sensitivity, namely:
an axis of sensitivity $A_Z$ parallel to the azimuth axis of sensitivity $G_Z$ of gyro G,
a rolling sensitivity axis $A_X$ parallel to the rotational axis $S_G$ of gyro G,
and a pitching sensitivity axis $A_Y$ parallel to the longitudinal axis 2 of the vehicle.

The inclination signal $SA_Z$ from such an accelerometric block A gives the calculated pitching $(TA)_c$ of the vehicle and the pitching inclination signal $SA_Y$ from the accelerometric block A gives, by redundancy, the pitching of the (vertical or horizontal drilling sensitivity ensured).

In portions I-II and II-III of the drill-hole, where the axis of the vehicle is substantially vertical, the installation then behaves, during the continuous descent of the vehicle, like a directional installation, the rotational axis of the gyro not being levelled.

Numerous navigational methods may then be contemplated in these portions; however, the method which consists, first of all in finding the North (vehicle stopped) and then in causing the axis of rotation of the gyro to rotate in azimuth through an angle (measured at the angular rolling position detector $P_Y$) so that the axis of rotation of the gyro is practically perpendicular to the mean vertical plane which contains at best portions I-II and II-III (for example point III being possibly the one where the inclination of the drillhole with respect to the horizontal is 15°).

Thus, from points I to III of the path of the drillhole, the axis of rotation of the gyro "geometrically connected to the gimbal" will only slope a little (by a value less than or equal to 1°) and the horizontal projection of the axis of rotation of the gyro will only rotate very little in azimuth and this despite the azimuth precession of the gyro which is less than or equal to 0.2°.

With this situation, passing over to "directional operation with the axis of rotation of the gyro levelled", in portion III-IV, and such as described in relation to FIG. 10, will be facilitated.

I claim:

1. A gyroscopic navigational installation mounted on a movable vehicle having a longitudinal axis and having a trajectory when moving, said gyroscopic navigational installation comprising a gimbal supported by said vehicle for pivoting around a pivot axis, said gimbal having a rolling torquer motor and an angular rolling position detector, said position detector having a stator that is fixed on said gimbal;

a first gyro having a gyro wheel rotating around a rotational axis, said first gyro having two axes of sensitivity, said first gyro being supported by said gimbal so that one of said axes, an azimuth sensitivity axis, is orthogonal to said pivot axis, the other one of said axes, a rolling sensitivity axis, being parallel to said pivot axis, and so that said first gyro rotational axis is maintained in an horizontal plane, said first gyro being provided with azimuth position detectors, with rolling position detectors, and with an azimuth precessional torquer motor;

said azimuth position detectors of said first gyro controlling said azimuth precessional torquer motor of said first gyro and giving an indication which is used, on the one hand, to obtain an azimuth parameter representing an angular rate signal ($\Omega_z$) characterizing the vehicle trajectory and, on the other hand, to obtain an auxiliary azimuth aiming function, and said rolling position detectors of said first gyro controlling said rolling torquer motor of said gimbal which carries said stator of said angular rolling position detector and said rolling position detector giving indications which are used to obtain an auxiliary rolling aiming function;

a controlled accelerometer having two axes of sensitivity, said controlled accelerometer being supported by said gimbal so that one of said axes, a pitching sensitivity axis, is parallel to said pivot axis and so that the other one of said axes, a rolling sensitivity axis, is parallel to said first gyro rotational axis, said controlled accelerometer being arranged for delivering first and second analogous signals, a rolling inclination signal ($SA_X$) and a pitching inclination signal ($SA_Y$), respectively, representative of the measurement of the accelerations of the vehicle along said rolling sensitivity axis and said pitching sensitivity axis;

said rolling inclination signal ($SA_X$) of said accelerometer (after correction of a centrifugal effect ($\Omega_z.V$)) being used for levelling, by precession, said rotational axis of said first gyro, which causes a slow rotation of said gimbal around said rolling sensitivity axis of said first gyro;

a second gyro having at least one axis of sensitivity, a pitching sensitivity axis, said second gyro being supported by said gimbal so that said pitching sensitivity axis is horizontal and is parallel to said first gyro rotational axis, said second gyro being provided with a pitching position detector and provided with a pitching precessional torquer motor;

said pitching position detector of said second gyro controlling the pitching precessional torquer motor of the second gyro and giving a signal ($\Omega_x$) which is used to obtain an auxiliary pitching aiming function, said pitching inclination signal ($SA_Y$) of said accelerometer being used for indicating pitching in the long term, and said second gyro being used for indicating an exact short term rate ($\Omega_x$) which is the pitching rate;

whereby the complementarity of the spectra of said signals ($SA_y$) and ($\Omega_x$) allows an analogous or digital computing loop to be formed leading to a computed value of the pitching which is substantially accurate over the whole range of the spectrum, in the long and in the short term.

2. The installation according to claim 1, wherein said first gyro is looped about said azimuth sensitivity axis thereof so as to give a measured gyrometric value and is looped on said gimbal about said rolling sensitivity axis thereof, said first gyro receiving a computed precession equal to ($\Omega_z$) tan $(Ta)_c$, where $(Ta)_c$ is the calculated pitching angle, whereby the drift of the conical movement about said azimuth sensitivity axis, (truly vertical) is zero, which allows the heading (K) to be computed by the formula:

$$K = K_o + \int_o^t \frac{(\Omega_z)_M}{\cos (Ta)_c} dt - (\Omega \sin L + B)(t - to),$$

where
$K_o$ is the initial heading
t is the time
$\Omega \sin L$ is the vertical component of the Earth's rotation
B is the imbalance of the gyro wheel of first gyro and
to is the initial time
whereby the conical motion drift of the integrated measurement ($\Omega_x$) is zero (pitching computation), which allows a simple computation of the pitching using only the gyroscopic measurement ($\Omega_x$).

3. The installation according to claim 1 or 2 wherein said second gyro is comprised of a rate gyro.

4. The installation according to claim 1 or 2 wherein said second gyro is comprised of a floating gyro with one degree of freedom electrically looped as a rate gyro.

5. The installation according to claim 1 or 2 wherein said second gyro is comprised of a gyro having two axes of sensitivity only one of which is used.

6. The installation according to claim 5 wherein said second gyro is movably mounted on said gimbal so as to be able to occupy two diametrically opposite positions by pivoting around an axis parallel to said azimuth sensitivity axis of said first gyro which is self-contained North seeking.

7. The installation according to claim 1 wherein said pivot axis of said gimbal is parallel to the longitudinal axis of the vehicle.

8. The installation according to claim 1 wherein said pivot axis of said gimbal is disposed transversely to the longitudinal axis of the vehicle.

9. A gyroscopic navigational installation mounted on a movable vehicle having when moving a trajectory and a substantially zero pitching force and a constant linear speed, said vehicle having a longitudinal axis, said gyroscopic navigational installation comprising a gimbal supported by said vehicle for pivoting around said longitudinal axis, said gimbal having a rolling torquer motor and an angular rolling position detector, said position detector having a stator that is fixed on said gimbal;

a gyro having a gyro wheel rotating around a rotational axis, said gyro having two axes of sensitivity, said gyro being supported by said gimbal so that one of said axes, an azimuth sensitivity axis, is orthogonal to said longitudinal axis, the other of said axes, a rolling sensitivity axis, being parallel to said longitudinal axis, and so that said gyro rotational axis is maintained in a horizontal plane, said gyro being provided with azimuth position detectors, with rolling position detectors, and with an azimuth precessional torquer motor;

said azimuth position detectors of said gyro controlling said azimuth precessional torquer motor of said gyro and giving an indication which is used for obtaining an azimuth parameter representing angular speed ($\Omega_z$) characterizing the vehicle trajectory, and said rolling position detectors of said gyro controlling said rolling torquer motor of said gimbal which carries said stator of said angular rolling position detector;

a controlled accelerometer having two axes of sensitivity, said controlled accelerometer being supported by said gimbal so that one of said axes, a pitching sensitivity axis, is parallel to said longitudinal axis, and so that the other one of said axes, a rolling sensitivity axis, is parallel to said gyro rotational axis, said controlled accelerometer being arranged for delivering two analogous signals, a rolling inclination signal ($SA_X$) and a pitching inclination signal ($SA_Y$), respectively, representative of the measurement of the accelerations of the vehicle along said rolling sensitivity axis and said pitching sensitivity axis;

said rolling inclination signal of said accelerometer (after correction of the centrifugal effect ($\Omega_z.V$)) being used for levelling, by precession, said rotational axis of said gyro, which causes a slow rotation of said gimbal around said rolling sensitivity axis of said gyro, said pitching inclination signal of said accelerometer indicating the pitching of the vehicle, considering the absence of rapid pitching force and the constant speed of the vehicle.

10. A gyroscopic navigational installation mounted on a movable vehicle having a longitudinal axis and having a trajectory when moving, said gyroscopic navigational installation comprising:
- a gimbal supported by said vehicle for pivoting around said longitudinal axis, said gimbal having a rolling torquer motor and an angular rolling position detector, said position detector having a stator that is fixed on said gimbal;
- a gyro having a gyro wheel rotating around a rotational axis, said gyro having two axes of sensitivity, said gyro being supported by said gimbal so that one of said axes, an azimuth sensitivity axis, is orthogonal to said longitudinal axis, the other one of said axes, a rolling sensitivity axis, being parallel to said longitudinal axis, and so that said rotational axis is maintained in an horizontal plane, said gyro being provided with azimuth position detectors, with rolling position detectors, and with an azimuth precessional torquer motor;
- said gyro azimuth position detectors controlling said gyro azimuth precessional torquer motor and giving an indication which is used for obtaining an azimuth parameter representing an angular speed ($\Omega_z$) characterizing the vehicle trajectory, said gyro rolling position detectors controlling said gimbal rolling torquer motor which carries said stator of said angular rolling position detector;
- a controlled accelerometer having at least two axes of sensitivity, said controlled accelerometer being supported by said gimbal so that one of said axes, an azimuth sensitivity axis, is parallel to said gyro azimuth sensitivity axis, and so that the other one of said axes, a rolling sensitivity axis, is parallel to said gyro rotational axis, said controlled accelerometer being arranged for delivering an azimuth inclination signal ($SA_z$) and a rolling inclination signal ($SA_x$);
- said rolling inclination signal ($SA_x$) of said accelerometer being used for levelling, by precession, said rotational axis of said gyro, which causes a slow rotation of said gimbal around said gyro rolling sensitivity axis of said gyro, and said azimuth inclination signal ($SA_z$) of said accelerometer being filtered so as to indicate the pitching of the vehicle.

11. An installation according to claim 10 wherein said accelerometer comprises three axes of sensitivity, namely:
- an axis of sensitivity parallel to the azimuth sensitivity axis of the gyro;
- a rolling sensitivity axis parallel to the rotational axis of the gyro;
- a pitching sensitivity axis parallel to the longitudinal axis of the vehicle; and wherein
- said controlled accelerometer is also arranged for delivering a pitching inclination signal ($SA_y$) that indicates the pitching of the vehicle.

12. An installation according to claims 10 or 11, wherein the installation is used as a connected component North seeking installation when the longitudinal axis of the vehicle is vertical and the vehicle stopped and locked to the ground.

13. An installation according to claim 12, wherein when said installation is not used in a North seeking function, said gyro rotation axis is set in a substantially horizontal position, perpendicularly to the presumed mean vertical plane of the curve of the trajectory of the vehicle, and then the vehicle resumes its movement while keeping its known azimuth.

* * * * *